US008867776B2

(12) United States Patent
Schul

(10) Patent No.: US 8,867,776 B2
(45) Date of Patent: Oct. 21, 2014

(54) AUDIO SPEAKER FRAME FOR MULTIMEDIA DEVICE

(71) Applicant: Imation Corp., Oakdale, MN (US)

(72) Inventor: Eran Schul, St. Paul, MN (US)

(73) Assignee: Imation Corp., Oakdale, MN (US)

(*) Notice: Subject to any disclaimer, the term of this patent is extended or adjusted under 35 U.S.C. 154(b) by 0 days.

(21) Appl. No.: 13/737,241

(22) Filed: Jan. 9, 2013

(65) Prior Publication Data

US 2013/0188821 A1 Jul. 25, 2013

Related U.S. Application Data

(60) Provisional application No. 61/584,596, filed on Jan. 9, 2012.

(51) Int. Cl.

| | |
|---|---|
| ***H04R 1/02*** | (2006.01) |
| ***H04B 3/00*** | (2006.01) |
| ***H04R 9/06*** | (2006.01) |
| ***H04R 5/04*** | (2006.01) |
| ***H04R 5/02*** | (2006.01) |

(52) U.S. Cl.

CPC .................. *H04R 1/026* (2013.01); *H04R 5/04* (2013.01); *H04R 2205/021* (2013.01); *H04R 2430/01* (2013.01); *H04R 5/02* (2013.01)

USPC ............... 381/394; 381/77; 381/80; 381/332; 381/334

(58) Field of Classification Search

CPC ...... H04R 27/00; H04R 5/04; H04R 2217/03; H04R 5/02; H04R 2205/021; H04R 1/025; H04R 2499/11; H04R 1/02; H04R 13/02; H04R 1/06; H04H 20/83; G10K 9/13

USPC .............................. 381/77, 80, 332, 334, 394

See application file for complete search history.

(56) References Cited

U.S. PATENT DOCUMENTS

| | | | |
|---|---|---|---|
| 3,725,583 | A | 4/1973 | Gunderson et al. |
| D230,194 | S | 1/1974 | Buckler |
| D268,673 | S | 4/1983 | Iijima |
| D361,071 | S | 8/1995 | Mark |
| D444,457 | S | 7/2001 | Kuo |
| D461,187 | S | 8/2002 | Andre et al. |
| D476,308 | S | 6/2003 | Bhavnani |
| D527,722 | S | 9/2006 | Yeh |
| D535,942 | S | 1/2007 | Kim |
| 7,212,110 | B1 | 5/2007 | Martin et |
| D551,652 | S | 9/2007 | Nakamura |
| D552,053 | S | 10/2007 | Kim |

(Continued)

OTHER PUBLICATIONS

Filing Receipt for U.S. Appl. No. 61/569,806, filed Dec. 13, 2011.

(Continued)

*Primary Examiner* — Matthew Eason
*Assistant Examiner* — Sean H Nguyen
(74) *Attorney, Agent, or Firm* — Dorsey & Whitney LLP

(57) ABSTRACT

A speaker frame for a display device, such as a tablet, provides enhanced audio output when a device is docked within the frame of speakers. The speaker frame includes a battery to power the speaker frame operation and provide additional power to a docked device. The speaker frame can also dock to a second base unit, which can include additional speakers.

17 Claims, 19 Drawing Sheets

(56) References Cited

U.S. PATENT DOCUMENTS

| | | | | |
|---|---|---|---|---|
| D571,356 | S | 6/2008 | Smith | |
| D575,766 | S | 8/2008 | Harris | |
| D578,510 | S | 10/2008 | Tanaka | |
| D596,156 | S | 7/2009 | Morisawa | |
| D607,283 | S | 1/2010 | Mahan et al. | |
| D610,569 | S | 2/2010 | Fiebel et al. | |
| 7,689,197 | B2 | 3/2010 | Laude et al. | |
| D617,775 | S | 6/2010 | Chae et al. | |
| D621,813 | S | 8/2010 | Wang et al. | |
| D624,527 | S | 9/2010 | Ho et al. | |
| D629,827 | S | 12/2010 | Morenstein et al. | |
| 7,953,239 | B2 | 5/2011 | Decanio | |
| D645,847 | S | 9/2011 | Chau | |
| D646,665 | S | 10/2011 | Iijima | |
| D654,473 | S | 2/2012 | Paddock | |
| D657,343 | S | 4/2012 | Cho et al. | |
| 8,180,095 | B2 | 5/2012 | Zhang | |
| D664,122 | S | 7/2012 | Cho et al. | |
| 8,391,510 | B2 | 3/2013 | Vincenot | |
| 2003/0231189 | A1 * | 12/2003 | Williams | 345/659 |
| 2004/0014426 | A1 | 1/2004 | Moore | |
| 2006/0050907 | A1 | 3/2006 | Levitsky | |
| 2007/0076911 | A1 * | 4/2007 | Schul et al. | 381/334 |
| 2007/0098191 | A1 * | 5/2007 | Wan et al. | 381/306 |
| 2007/0173294 | A1 | 7/2007 | Hsiung | |
| 2008/0025172 | A1 | 1/2008 | Holden et al. | |
| 2011/0297566 | A1 * | 12/2011 | Gallagher et al. | 206/320 |
| 2012/0051567 | A1 * | 3/2012 | Castor-Perry | 381/304 |
| 2012/0075789 | A1 * | 3/2012 | DeCamp et al. | 361/679.26 |
| 2012/0170212 | A1 * | 7/2012 | Gallouzi et al. | 361/679.56 |
| 2012/0189156 | A1 * | 7/2012 | Leung | 381/387 |
| 2012/0229380 | A1 * | 9/2012 | Silvester | 345/158 |
| 2012/0250924 | A1 | 10/2012 | Nicholson et al. | |
| 2012/0300962 | A1 | 11/2012 | Devoto | |
| 2012/0321120 | A1 * | 12/2012 | Han et al. | 381/387 |
| 2012/0325702 | A1 * | 12/2012 | Gallagher et al. | 206/320 |
| 2013/0033807 | A1 * | 2/2013 | Kim | 361/679.01 |
| 2013/0038634 | A1 * | 2/2013 | Yamada et al. | 345/649 |
| 2013/0058065 | A1 * | 3/2013 | Minaguchi et al. | 361/807 |
| 2013/0072265 | A1 * | 3/2013 | Deluca | 455/566 |
| 2013/0080762 | A1 * | 3/2013 | Cretella et al. | 713/100 |
| 2013/0109253 | A1 * | 5/2013 | Gammon et al. | 439/883 |
| 2013/0178155 | A1 * | 7/2013 | Shulenberger | 455/41.1 |
| 2013/0178161 | A1 * | 7/2013 | Shulenberger | 455/41.2 |

OTHER PUBLICATIONS

Filing Receipt and application for Israeli Design Application 51531, filed Nov. 11, 2011.

Design U.S. Appl. No. 29/410,496, filed Jan. 9, 2012.

Design U.S. Appl. No. 29/410,493, filed Jan. 9, 2012.

Design U.S. Appl. No. 29/410,487, filed Jan. 9, 2012.

U.S. Appl. No. 13/737,172, filed Jan. 9, 2013.

U.S. Appl. No. 13/737,365, filed Jan. 9, 2013.

* cited by examiner

AUDIO SPEAKER FRAME FOR MULTIMEDIA DEVICE

CROSS-REFERENCE TO RELATED APPLICATIONS

This application claims priority to U.S. Provisional Application No. 61/584,596, filed Jan. 9, 2012, the content of all of which is hereby incorporated in its entirety by reference.

Inventions described in this application can also be used in combination or conjunction, or otherwise, with the subject matter described in one or more of the following:

U.S. patent application Ser. No. 13/737,365, filed Jan. 9, 2013, entitled "WIRELESS AUDIO PLAYER AND SPEAKER SYSTEM," which claims priority to U.S. Provisional Application 61/584,609, filed Jan. 9, 2012; and U.S. patent application Ser. No. 13/737,172, filed Jan. 9, 2013, entitled "WIRELESS AUDIO PLAYER AND SPEAKER SYSTEM," which claims priority to U.S. Provisional Application 61/584,605, filed Jan. 9, 2012.

Each and every one of these documents is hereby incorporated by reference as if fully set forth herein.

BACKGROUND OF THE DISCLOSURE

The continuum between highly mobile computers with low weight, low power-consumption, etc., and powerful computers with larger/faster resources, faster input interfaces, etc. continues to become more seamless from one class of devices to another. From smart phones, to tablets, to net-books, to laptops, to docking stations, to PCs, and different versions within these defined classes of devices, a user's choice of mobility versus power runs an increasingly seamless continuum of choices. While user-choices can be made based on their most common need, other use patterns may hold a substantial minority for a user. For example, a traveling business user may primarily need a laptop, but often desire a tablet for multimedia viewing during transit. While the laptop can meet this need, it does so in an awkward fashion, where a tablet would be a better fit. As such, devices tend to include built-in or attachable features to facilitate wider use patterns, such as a laptop with a 180 degree swivel screen or a tablet with a keyboard/mouse docking station.

Devices such as tablets often include a basic audio output ability, and an output port for headphone devices, which may also be used for amplified speaker systems. Amplified speaker systems may fit the needs of internet surfers, text readers, public area multimedia viewers, etc., but other users may not desire such systems, or may prefer speaker output for multimedia content. Currently, there exists external amplified speaker options using the relatively low quality headphone output line, as well as tabletop base stations that reduce or eliminate the ability to take the tablet anywhere. There remains a need for a quality speaker system for tablets that does not detract from the primary mobility feature offered by tablet designs.

SUMMARY

Exemplary embodiments of the present disclosure can include a system for audio speakers for a mobile display device, including a frame housing with a plurality of sides forming a perimeter of an inner area. The housing can entirely surround the perimeter of the attached device, or it can attach to some or all of one side of the attached device, to some or all of two or more sides of the attached device. The housing can be one integral piece, or operably connected segments. The housing can include a device connector configured to connect to a device docked within the inner area and can also include audio speakers configured to output audio signals from a docked device.

In other exemplary embodiments, the housing can include at least one battery, which can supply power to a docked device. Exemplary embodiments can include a speaker controller configured to control the audio speakers. The speaker controller can be configured to receive a gyroscope signal that identifies an orientation of the frame housing. The speaker controller can determine an orientation of the frame housing, and allocate left-side audio signals to one or more speakers on a left side of the orientation and allocate right-side audio signals to one or more speakers on a right side of the orientation. The speaker controller can also determine a change in orientation of the frame housing that changes a left/right placement of at least one speaker and reallocate the at least one speaker's audio signal.

Other exemplary embodiments can also include a base unit configured to connect to and hold upright the frame housing. The exemplary base unit can include a additional speakers, which can be a second set of speakers. The base unit can be configured to connect to and hold upright one or more devices, independent of the frame housing. The exemplary additional speakers can be configured for low frequency audio signals when the frame housing with audio speakers is connected to the base unit. Also, the exemplary second set of speakers can be configured for full-range frequency audio signals when the one or more devices is connected to the base unit.

Exemplary frame housings can include at least one connector configured to dock with the base unit. Other exemplary frame housings can include at least two connectors on adjacent edges, one configured to dock with the base unit in a landscape orientation and another configured to dock with the base unit in a portrait orientation.

Another exemplary embodiment of the present disclosure can include a speaker frame device, including a frame housing including a plurality of sides forming a perimeter of an inner area. For at least one device, the speaker frame device can have an inner area that can be sized to receive the at least one device such that the shape of the frame housing with received device is substantially similar to the at least one device and larger in at least one dimension. Also, the inner area can include a connector to interface with an input connector of the at least one device. The housing can include one or more speakers, and a speaker controller can be configured to determine an orientation of the frame housing and allocate directional audio signals to one or more speakers, based on a determined orientation. The exemplary frame housing can also include at least one battery configured to power a docked device.

Other exemplary embodiments can include non-transitory computer readable storage mediums having a program embodied thereon, the program executable by a processor to perform a method for managing data in a non-volatile memory system according to any of the other or additional exemplary embodiments.

Figure 1:
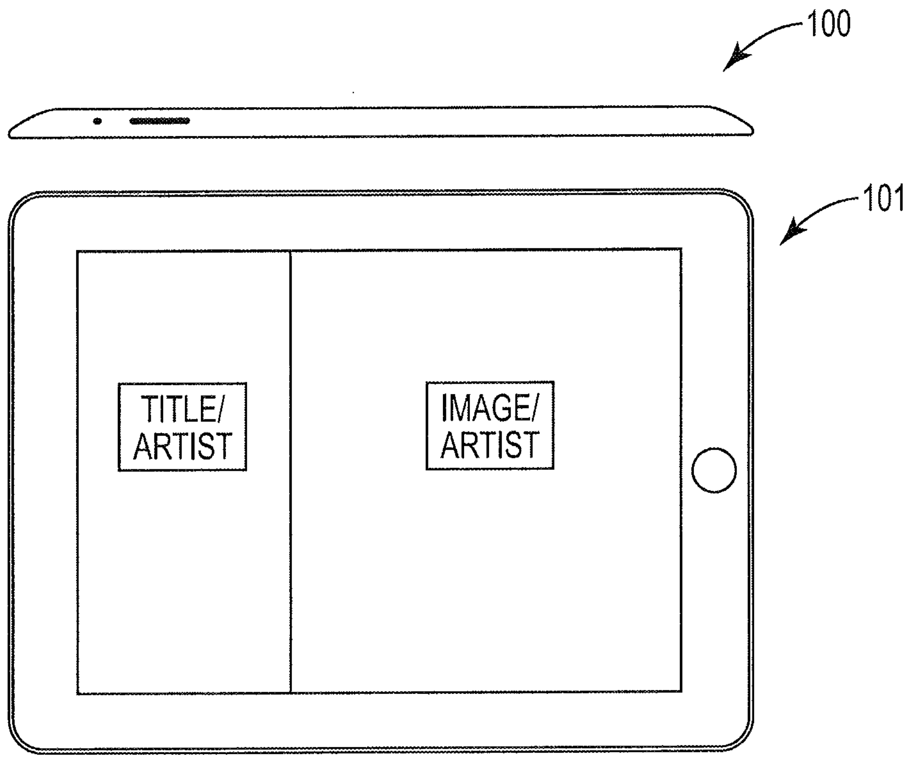
Fig. 1 PRIOR ART
FIG. 1 depicts an exemplary tablet device known in the prior art.

In the appended figures, similar components and/or features may have the same reference label. Further, various components of the same type may be distinguished by following the reference label by a dash and a second label that distinguishes among the similar components. If only the first reference label is used in the specification, the description is applicable to any one the similar components having the same first reference label irrespective of the second reference label.

DETAILED DESCRIPTION OF THE INVENTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiments of the disclosure. It should be understood that various changes may be made in the function and arrangement of elements without departing from the spirit and scope of the invention as set forth in the appended claims.

Exemplary embodiments of the present disclosure can include a speaker system for use in association with a multimedia display device, such as a smart phone, tablet, or other such device. In one exemplary embodiment, a frame including one or more speakers can be provided to fit a specific size device, or include attachments to fit a specific size device, to create a version of the device that is connected to and framed by audio speakers. Exemplary embodiments described herein can use an iPad® tablet by Apple® Inc. as an exemplary illustration in the drawings and description, which constitutes just one exemplary device with a specific set of dimensions and connections. Any other design, with any other dimensions and connections, could be used in other exemplary embodiments, including laptops, smart phones, other tablets, etc.

Figure 2:
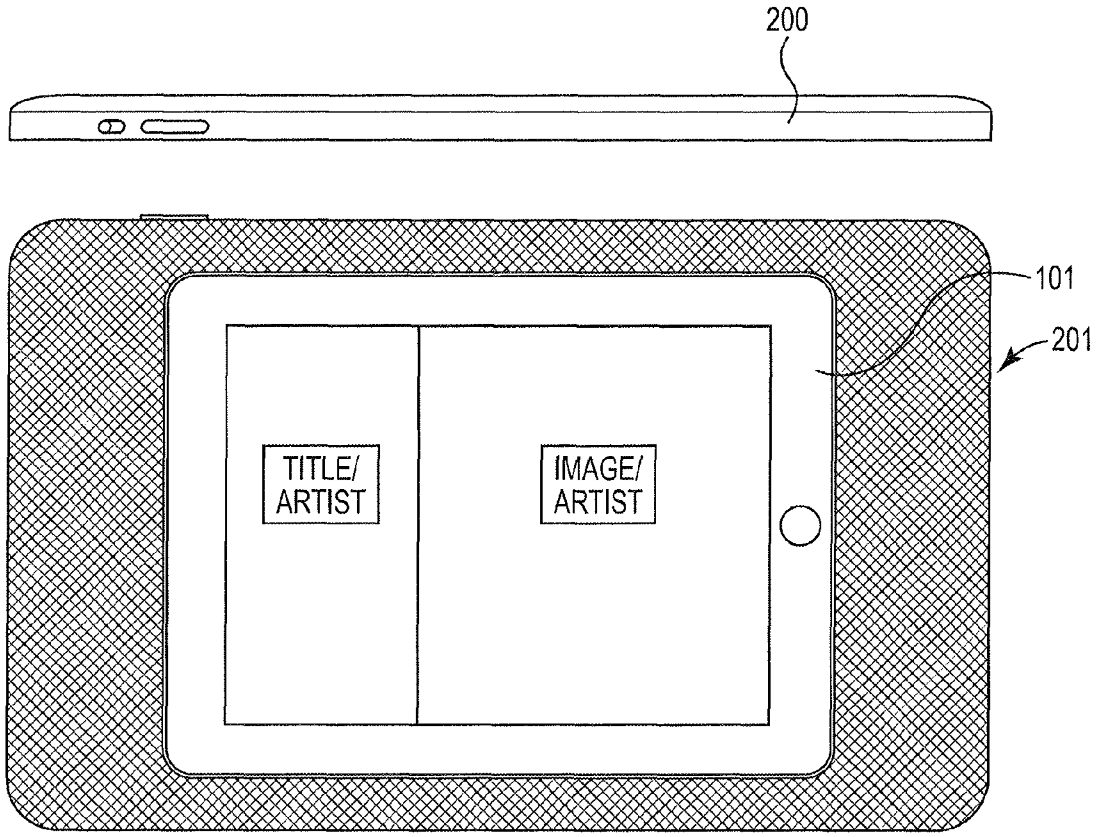
FIG. 2 depicts the exemplary tablet device docked within an exemplary speaker frame, according to one exemplary embodiment of the present disclosure.

FIG. 1 illustrates an example tablet (e.g., an iPad®) both in side view 100 and front view 101. FIG. 2 illustrates one exemplary embodiment of the present disclosure, including a frame of speakers 201. As illustrated, the frame of speakers can add to the length and width dimensions to provide the speakers, while in side view 200 it can be seen that the frame can add little or no depth to the inner tablet. Other exemplary embodiments can include other arrangements, such as speakers made into handles (e.g., base speakers or other frequency specific speakers), or provide other dimensions to the inner device.

Figure 3:
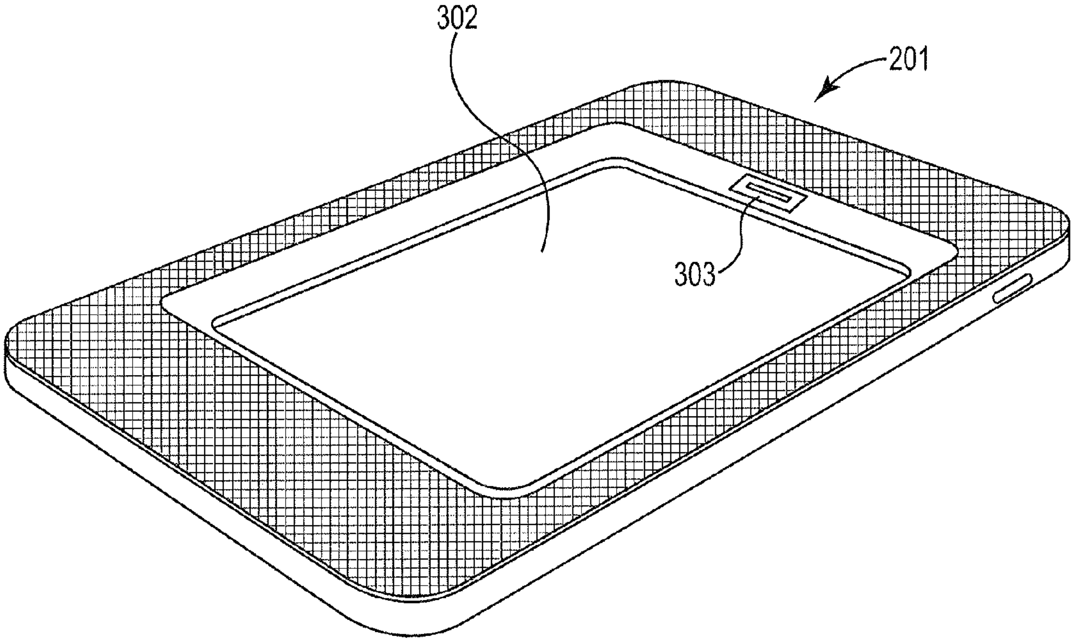
FIG. 3 depicts the exemplary speaker frame device.
Figure 4:
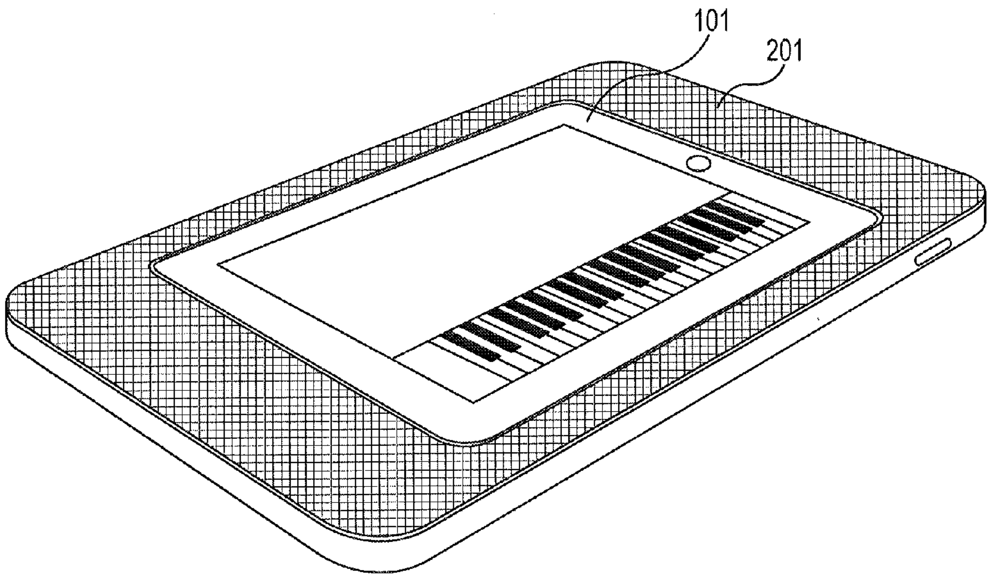
FIG. 4 depicts a perspective view of the exemplary speaker frame device with docked display device.

FIG. 3 illustrates another perspective view of the exemplary embodiment, without the inner device attached. The exemplary speaker frame can be configured to receive a device within inner area 302, and be further configured to interface with the device via a connector 303. Devices typically include one or more standard connectors for data synchronization, base station synchronization, and/or power charging, and exemplary frames can be configured with one or more of these reciprocal connectors. FIG. 4 illustrates a perspective view of the exemplary embodiment with a device included in the inner area 302.

Figure 5:
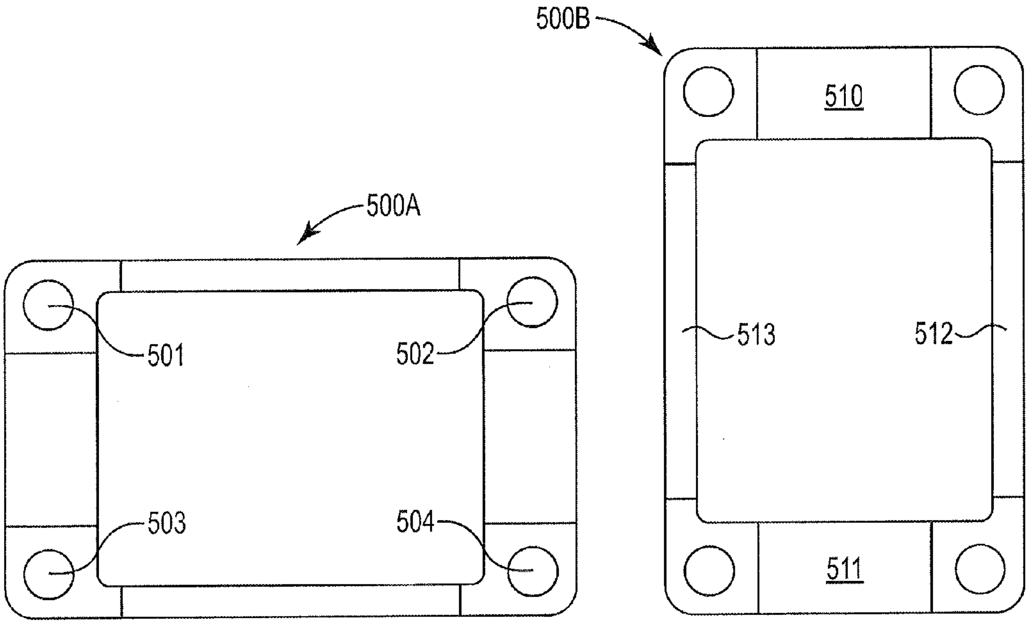
FIG. 5 depicts a wire-frame of the exemplary speaker frame with four exemplary speakers.

FIG. 5 illustrates in wire-frame one exemplary embodiment of the present disclosure both in a landscape view 500A and portrait view 500B. The speaker frame 500 includes four speakers 501-504 in the corners, connected by four segments 510-513. Segments 510-513 can be mere connecting segments, can house additional speakers, can include sensors (e.g. an orientation gyroscope), can include additional device (e.g. a microphone for video conferencing), can include batteries, or any number of other items.

It is to be appreciated that any desired number of speakers can be used in the devices of the present invention, and that these speakers can be directed to one or more channels and to different frequencies. For example, in one embodiment, the speaker frame can have a left channel speaker and a right channel speaker. In another embodiment, the speaker frame can have two left channel speakers and two right channel speakers. In another embodiment, the speaker frame can have one speaker. In another embodiment, the speaker frame can have one left channel speaker, one right channel speaker, and a subwoofer. Other combinations are possible.

The speaker frame can enable stereo or other directional speaker configurations. For example, a gyroscope sensor can detect when a user is holding the device in a 500A orientation, and allocate speakers 501 and 503 to left-side audio channels and speakers 502 and 504 to right side audio channels. Additionally, the gyroscope sensor can detect when a user is holding the device in a 500B orientation and allocate speakers 502 and 501 to left-side audio channels and speakers 503 and 504 to right-side channels. Any orientation is also possible, such as orientations 180 degrees from those described above, where the left/right speaker allocation is reversed. The gyroscope sensor can be included in the speaker frame, or an output from the device gyroscope can be provided through the connector (e.g., 303) to the speaker frame. Alternatively, control of the speakers can be performed at the device level, and allocations made through the connector (e.g., 303).

Exemplary speaker frames can also include a battery, which can power speaker amplification (e.g., audio control), sensors, control logic, status lights, etc. The speaker frame battery can be charged by the battery power of the inner display device in certain exemplary embodiments, can charge the battery of the inner display device in other exemplary embodiments, or a combination of these configurations in still other exemplary embodiments. In certain exemplary embodiments, the device power can directly power the speaker frame, which can include a battery or be powered exclusively from the device. In certain exemplary embodiments, the exemplary speaker frame can include a relatively large power supply capable of charging and/or powering an inner docked device (e.g., a tablet), which can provide, among other things, enhanced audio experience (e.g., via the speakers) along with extended battery life (e.g., via the speaker frame battery supply for, e.g., power intensive multimedia viewing, e.g., full length high definition (HD) movies). In other embodiments, the frame may be adapted to receive other sources of power, such as from a wall outlet, a vehicle power source (such as a cigarette lighter outlet), solar cells, or any other suitable power source.

While a docking connector (e.g., 303) can connect the speaker frame to the inner device, the speaker frame can include any number of other input and output ports. Some I/O ports can be provided as "pass through" ports, since the speaker frame may conceal I/O ports included on the device. These pass through ports can provide the same or modified functionality as the ones included on the device, but pass through the docking connector (e.g., 303). One such port can be a regular, mini, and/or micro USB connection (or any number of other connections standards). For powered bus connections (such as USB) this connection can be used to both synchronize data, power the device(s), and/or charge the batteries. In certain exemplary embodiments, a powered data connection can provide data to one or both of the speaker frame and inner device, and charge the batteries of one or both the speaker frame and inner device, and provide operating power to one or both of the speaker frame and inner device. Another exemplary I/O port can include a headphone port, so that a user can insert a headphone system or other audio system (e.g., any ⅛, ¼, or ½ inch connector device), without needing to remove the speaker frame from the inner device.

In some embodiments, the speaker frame can include ports adapted for connection to other devices, or to additional, external speakers. In one embodiment, the speaker frame contains a port adapted for connection to a subwoofer. In another embodiment, the speaker frame contains ports adapted for connection to additional external speakers, which can allow for the use of enhanced sound systems, such as surround sound systems.

In addition to I/O ports, the speaker frame can include a number of status indicators, such as battery LEDs, state LEDs, etc. The exemplary speaker frame can include a power control that can apply to only the speaker frame, only the inner device, and/or both. The exemplary speaker frame can include volume buttons, which can control the speaker frame and/or the device volume preferences (e.g., via base connector 303). Any number of other external controls, displays, and/or indicators are also possible in other exemplary embodiments.

Figure 6:
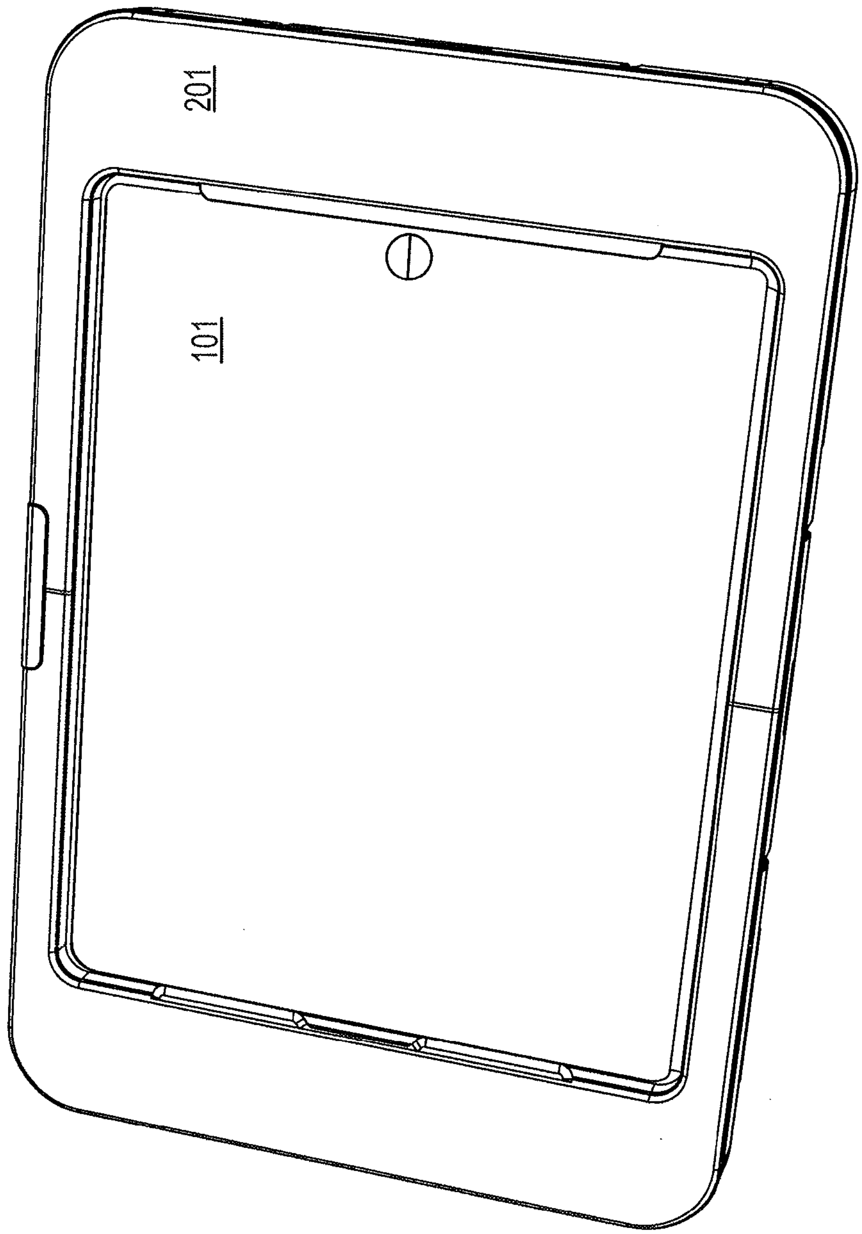
FIG. 6 depicts a wire-frame of an exemplary speaker frame, according to one exemplary embodiment of the present disclosure.
Figure 7:
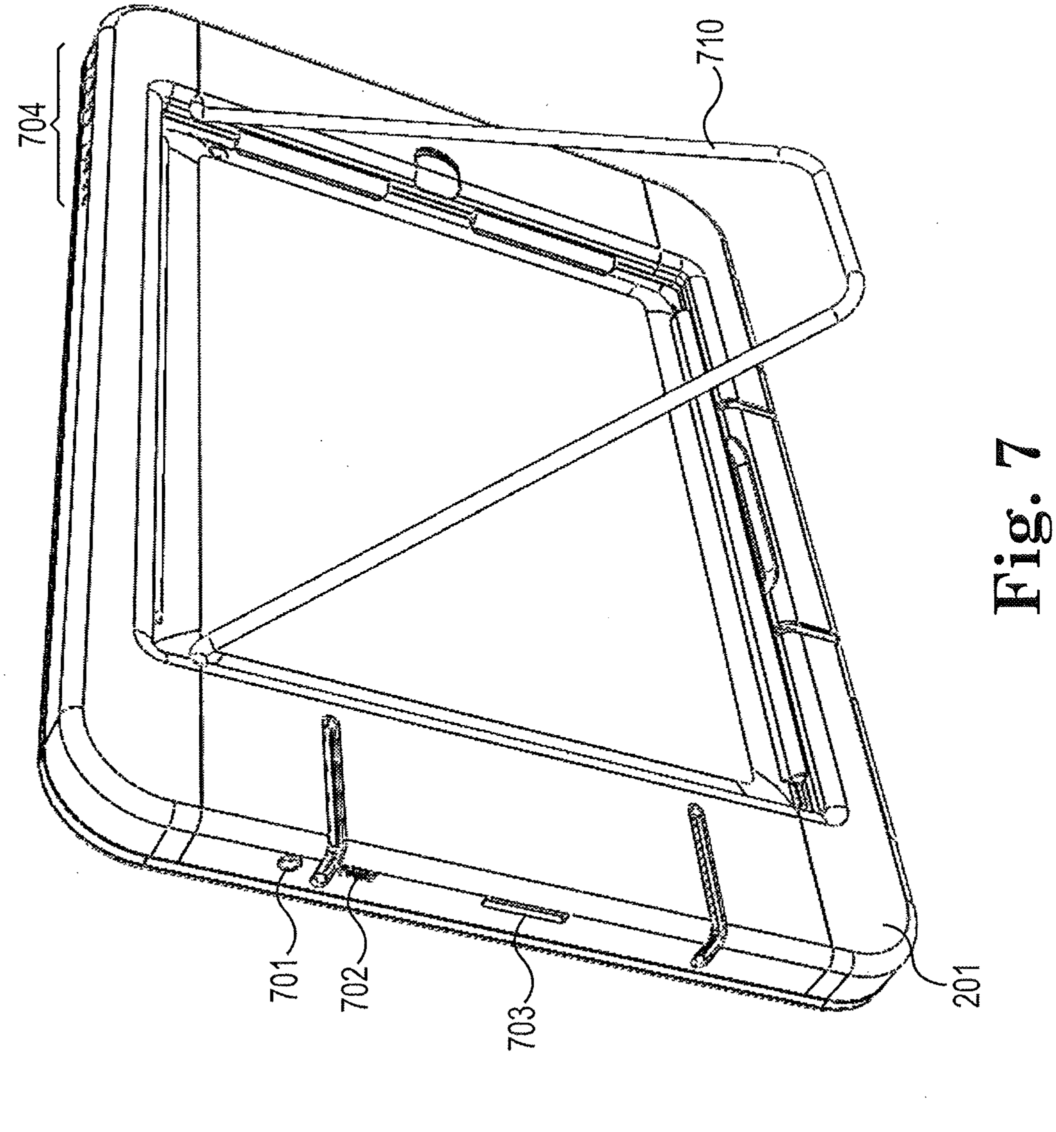
FIG. 7 depicts a rear view wire-frame of an exemplary speaker frame with an exemplary support stand, according to one exemplary embodiment of the present disclosure.

FIG. 6 illustrates in wire frame and exemplary embodiment of the present disclosure, including device 101 and exemplary speaker frame 201. The speaker frame itself can include a built in stand 710, as illustrated in the rear view of FIG. 7. This stand can allow the speaker frame, e.g., with the inner device, to sit upward on a surface (e.g., a table). The stand can be adjustable, and position-able, to allow the speaker frame to sit in one or more orientations. FIG. 7 also illustrates examples of the previously discussed exemplary connection ports, including a standard headphone port 701, a micro-USB port 702, and a proprietary port 703 (e.g., the standard Apple® data/power connector). FIG. 7 also illustrates examples of the previously discussed exemplary controls and indicators 704.

Figure 8:
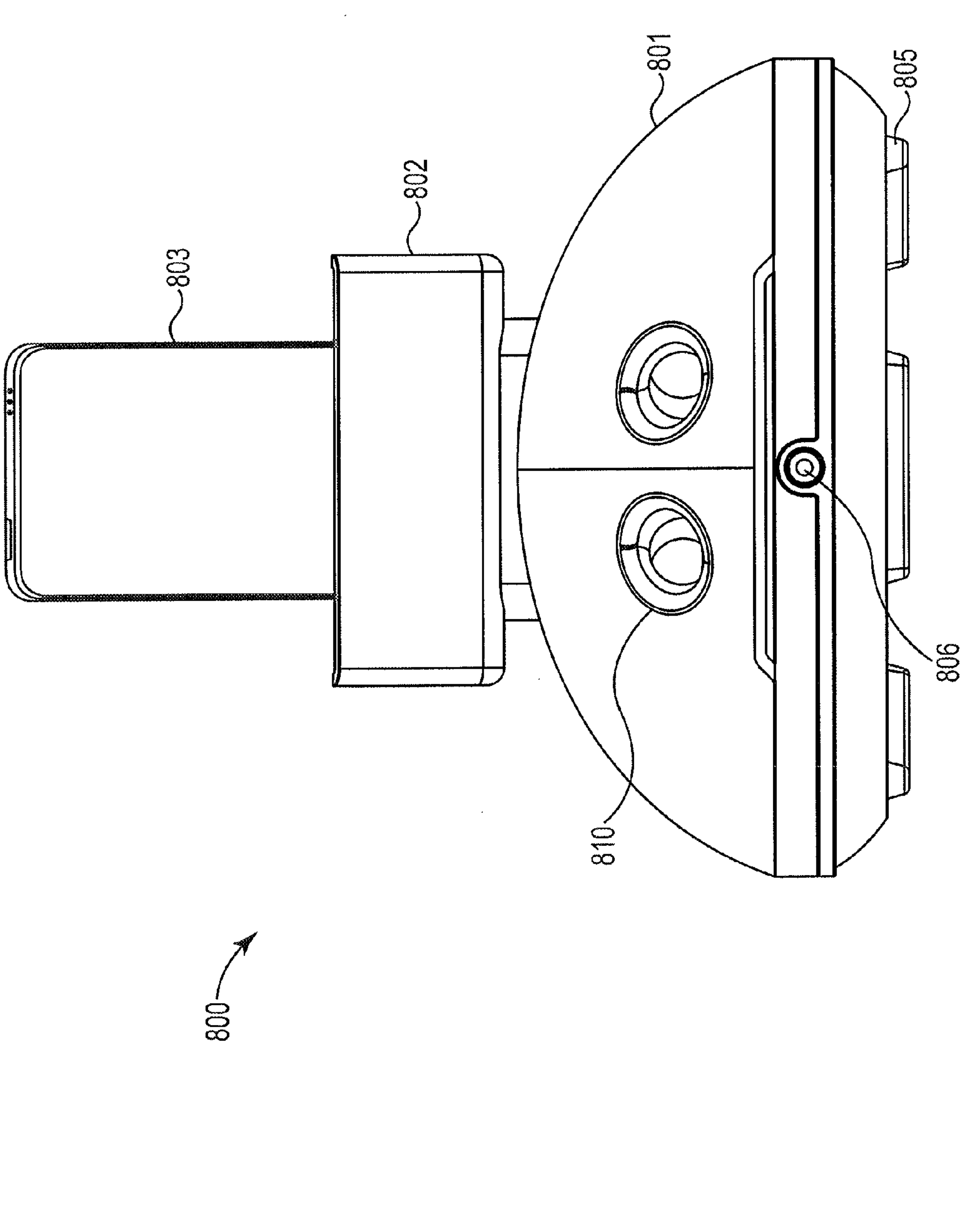
FIG. 8 depicts an exemplary rear view wire-frame base unit, according to one exemplary embodiment of the present disclosure.

In addition to or as an alternative to stand 710, exemplary embodiments of the present disclosure can include a base station stand, such as the one illustrated in FIG. 8. The exemplary base unit 800 can include a base portion 801, a main cradle 802 that can include a connector, and a device (e.g., a smart phone, tablet, etc.) 803. The main cradle 802 can itself be a speaker frame, as in FIG. 5. The main cradle 802 can be configured to accommodate any desired device, such as a smart phone, tablet, laptop, PC, speaker frame of FIG. 5, etc. FIG. 8 can be a rear view of the base unit 800. The base unit 800 and/or base portion 801 can include an input/output port, control button, or control indicator 806. This can be a power light, or a headphone input port, or a power button, etc. Other controls, ports, and indicators can be located at 806 or any other portion of the base unit 800. The base unit 800 can include additional speakers 810. These speakers can be the same or different than speakers 501-504. For example, speakers 810 can be optimized for low frequency (e.g., "bass") outputs. That is, when the speaker frame is docked, base speakers 810 can act as a subwoofer and apply equalization contoured specifically for this exemplary configuration (e.g., with a low pass filter). Thus, when a device is used with only speaker frame 201, the output can be optimized for a system that does not include bass-optimized speakers and provides a mix of frequencies from the 501-504 speakers (e.g., full-range monaural mode). Then, when speaker frame 201 is joined with base unit 800, the speakers 501-504 can be used for mid-high frequencies, while the bass-optimized base speakers 810 can be used for the lower frequencies. In other exemplary embodiments base speakers 810 can be all-purpose speakers (e.g., full-range monaural speakers) or both bass-optimized when the speaker frame is docked and full-range when just a device is docked. In other exemplary embodiments speakers 501-504 can include one or more bass-optimized speakers.

Figure 9:
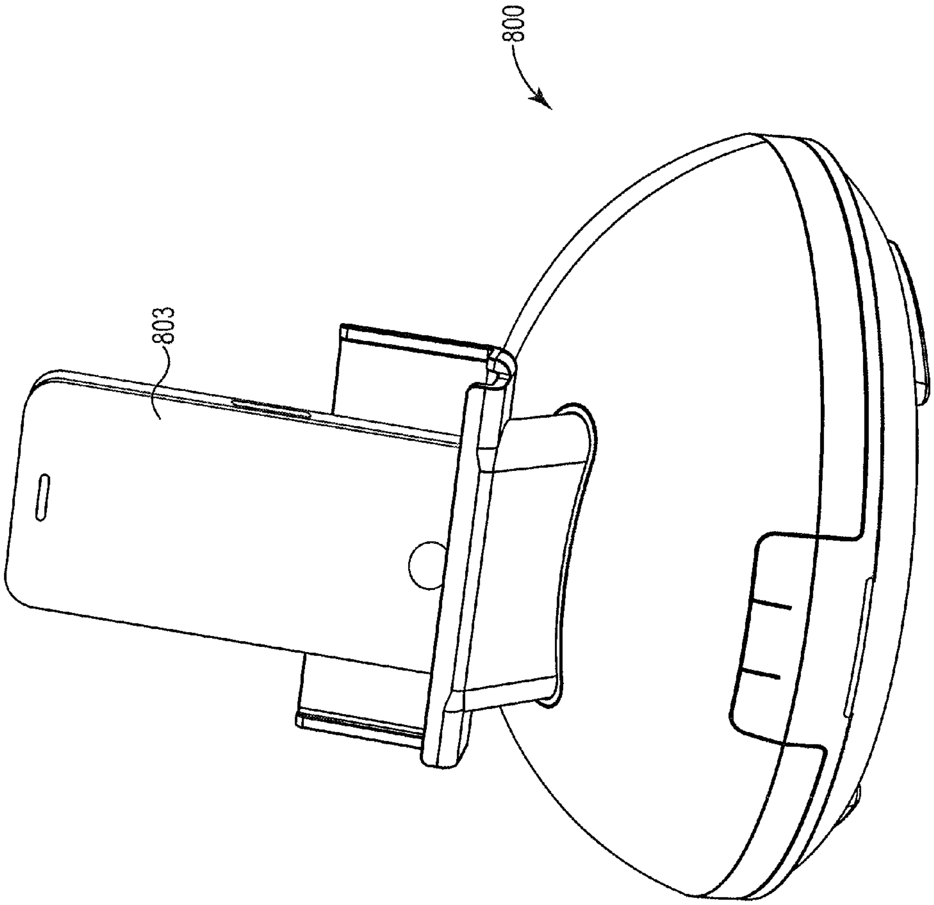
FIG. 9 depicts an exemplary front view wire-frame base unit, according to one exemplary embodiment of the present disclosure.
Figure 10:
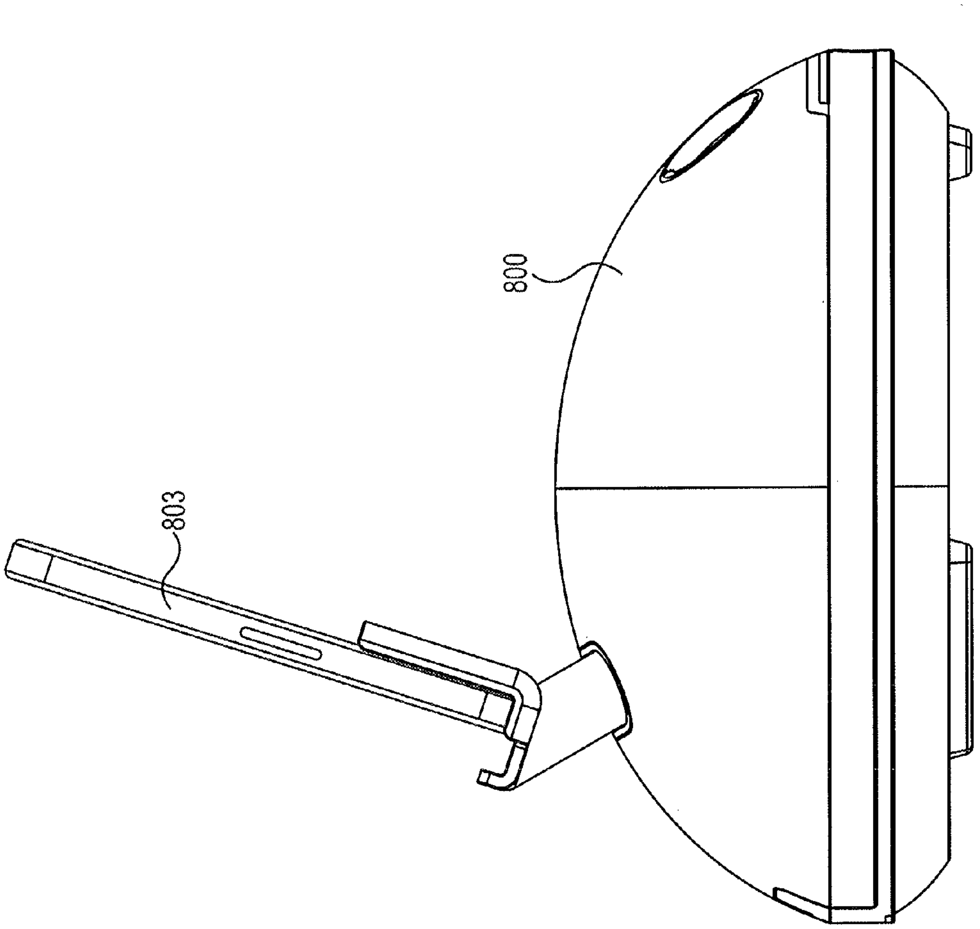
FIG. 10 depicts an exemplary side view wire-frame base unit, according to one exemplary embodiment of the present disclosure.

FIG. 9 illustrates the exemplary base unit 800 and exemplary smart phone 803 (e.g., an iPhone® from Apple® Inc.) docked at the base unit. As illustrated, the base unit 800 can be used with a device, with or without the exemplary speaker frame 201. FIG. 10 illustrates a side view of the arrangement of FIG. 9.

Figure 11:
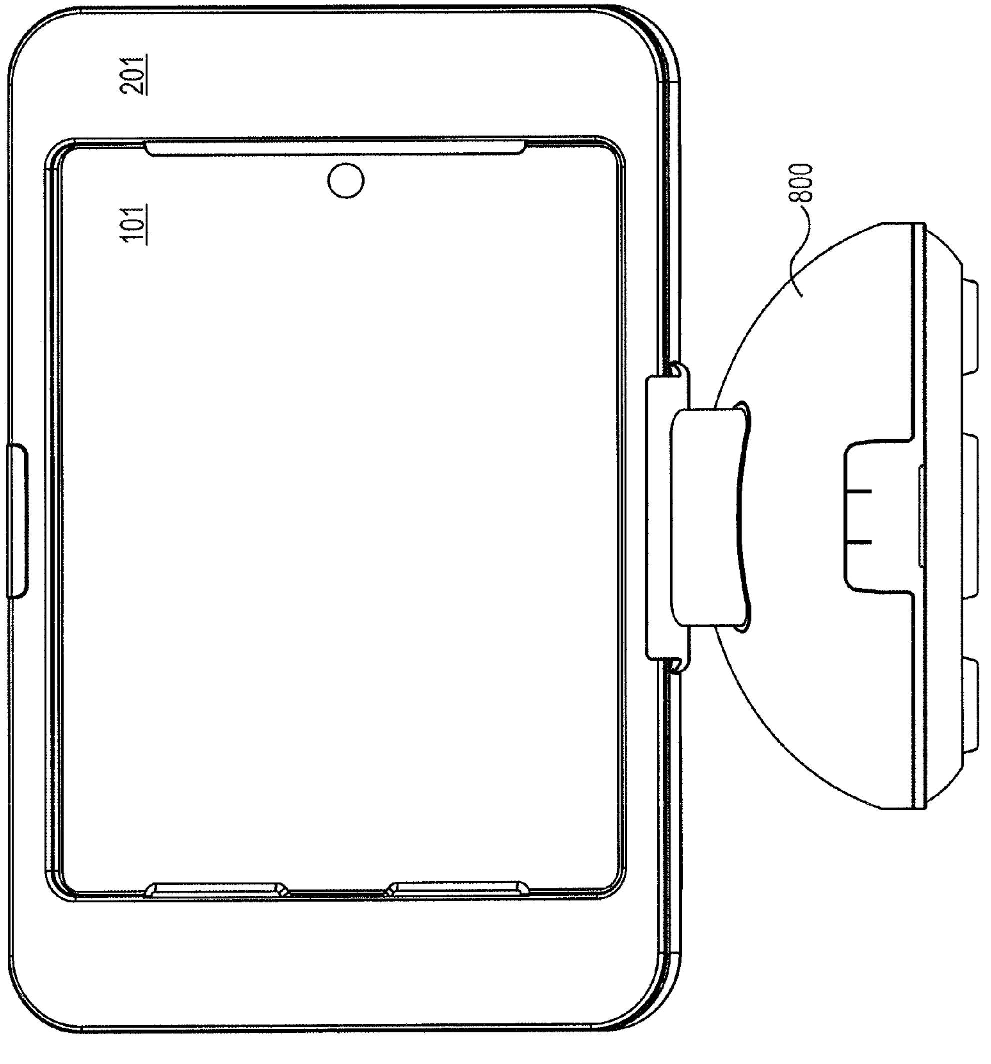
FIG. 11 depicts an exemplary front view wire-frame of an exemplary speaker frame with docked device, docked on an exemplary base unit, according to one exemplary embodiment of the present disclosure.
Figure 12:
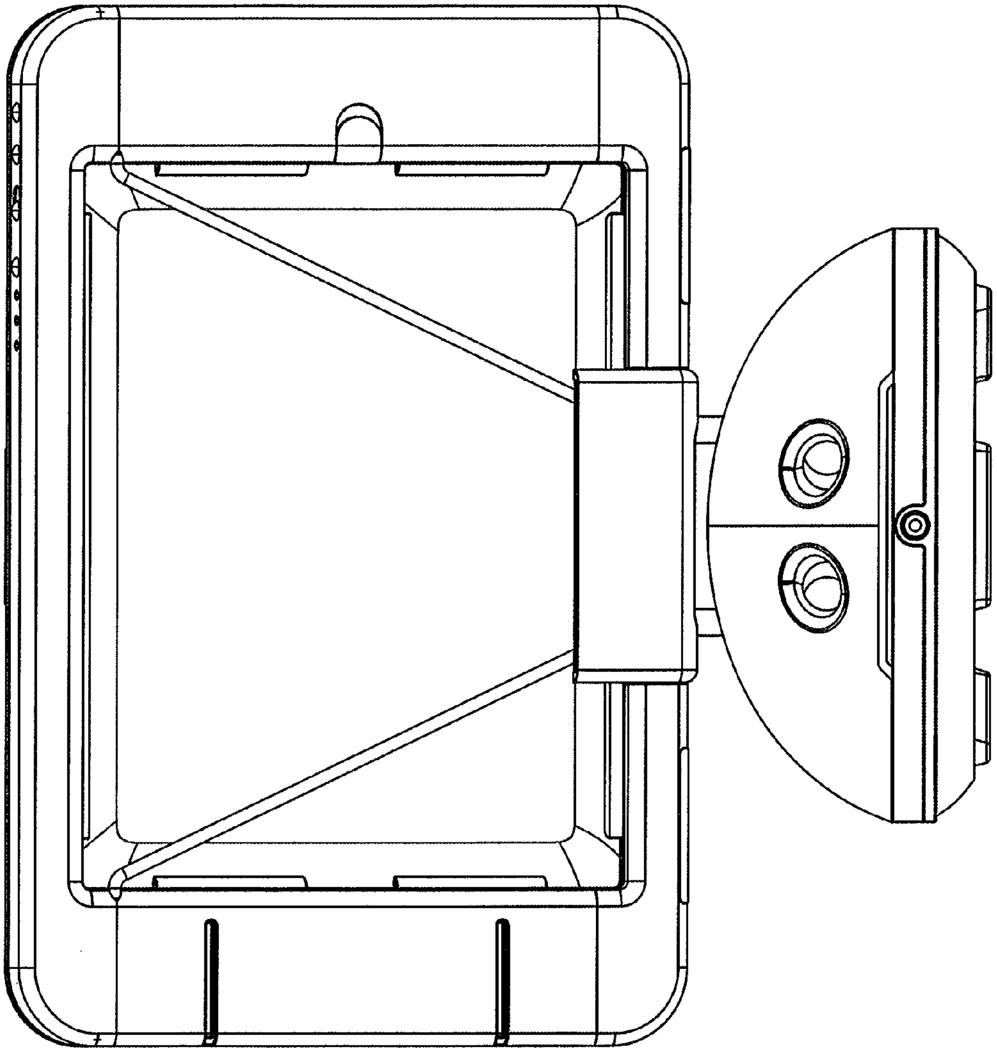
FIG. 12 depicts an exemplary rear view of the exemplary embodiment of FIG. 11
Figure 13:
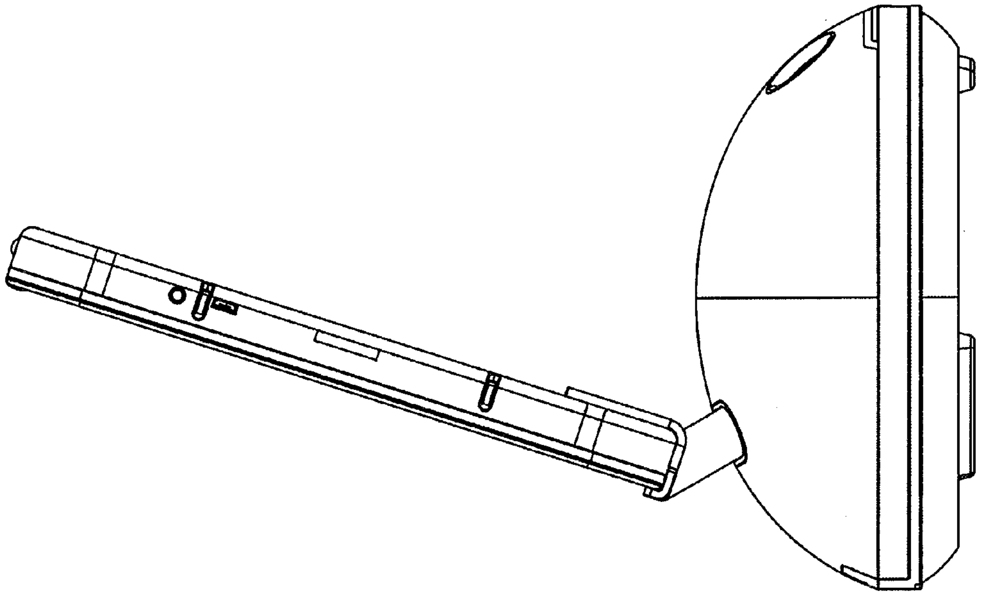
FIG. 13 depicts an exemplary side view of the exemplary embodiment of FIG. 11
Figure 14:
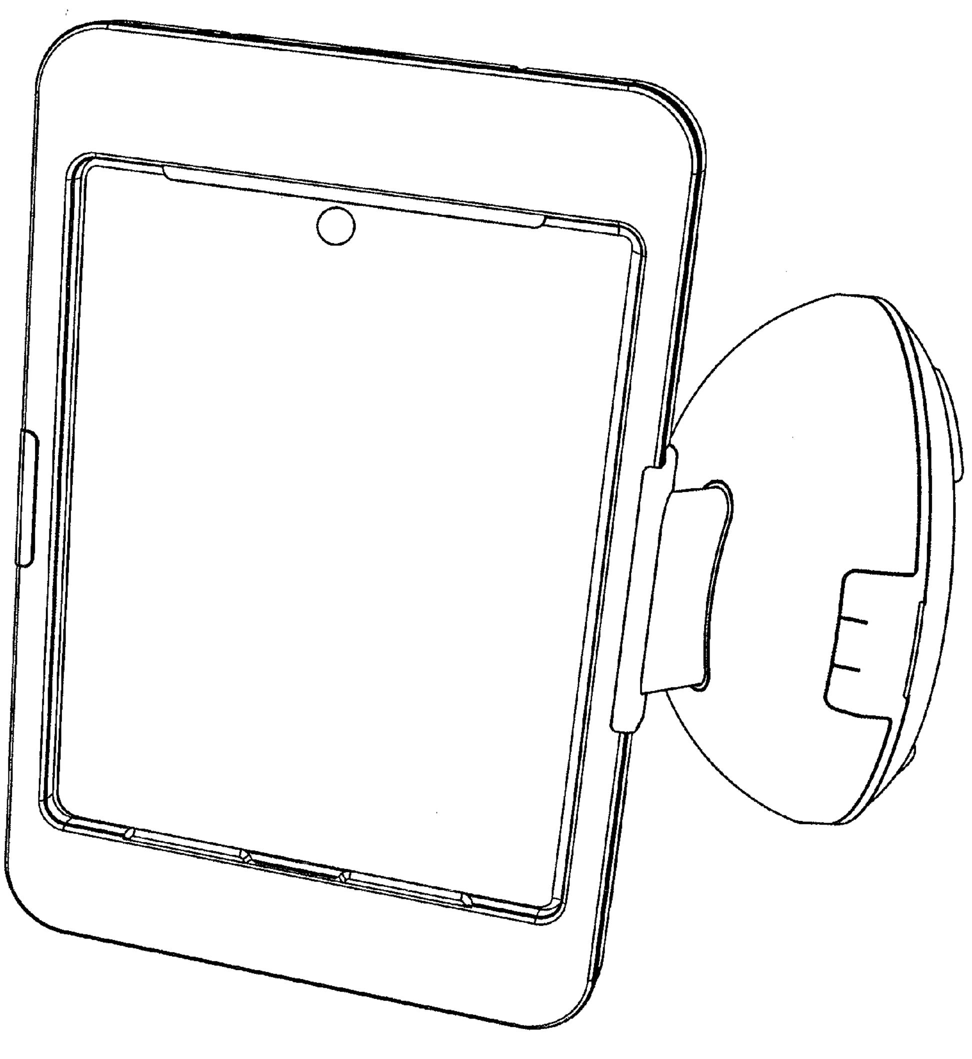
FIG. 14 depicts an exemplary perspective view of the exemplary embodiment of FIG. 11
Figure 15:
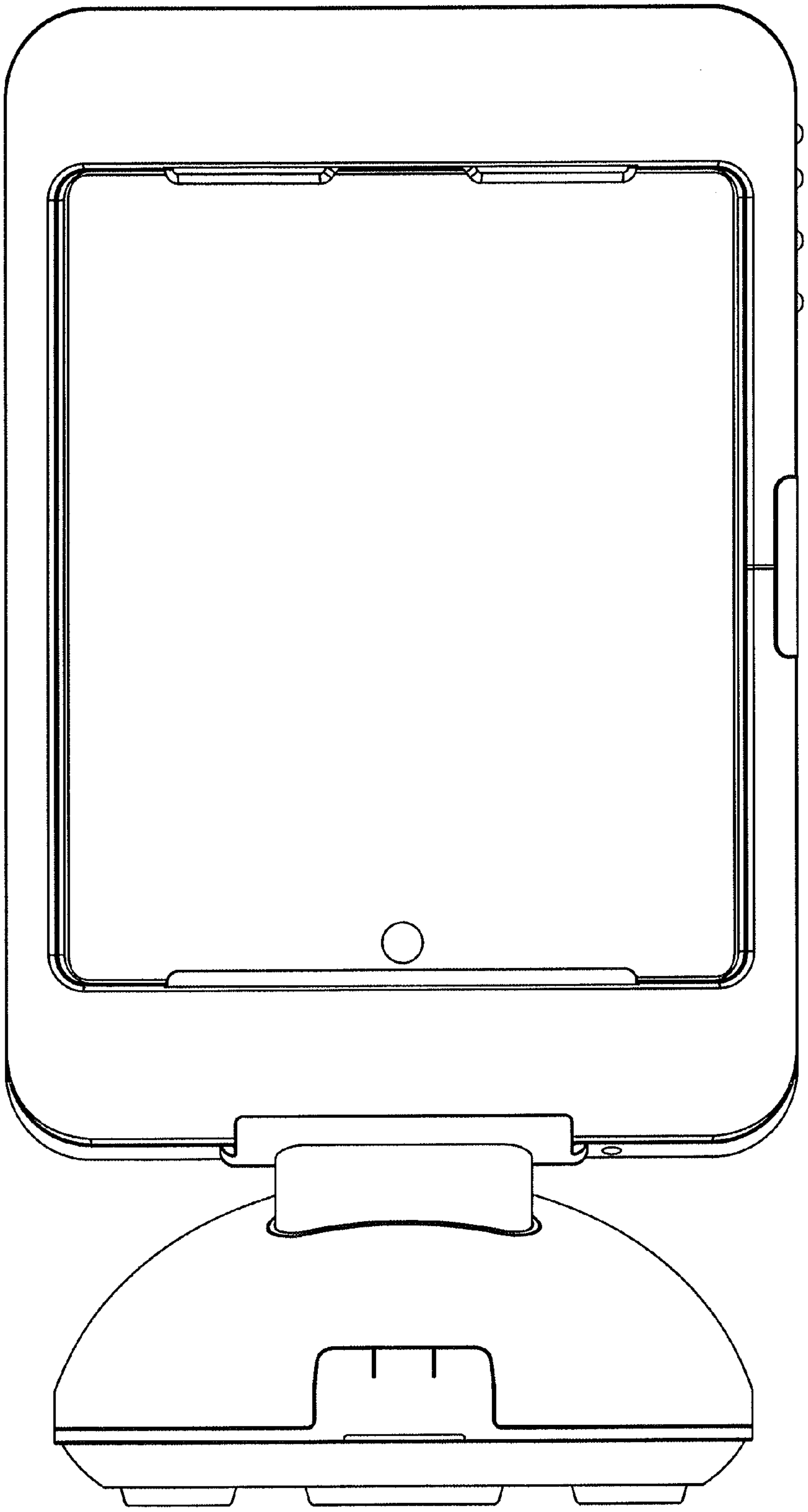
FIG. 15 depicts an exemplary front view wire-frame of an exemplary speaker frame with docked device, docked on an exemplary base unit in a portrait orientation, according to one exemplary embodiment of the present disclosure.
Figure 16:
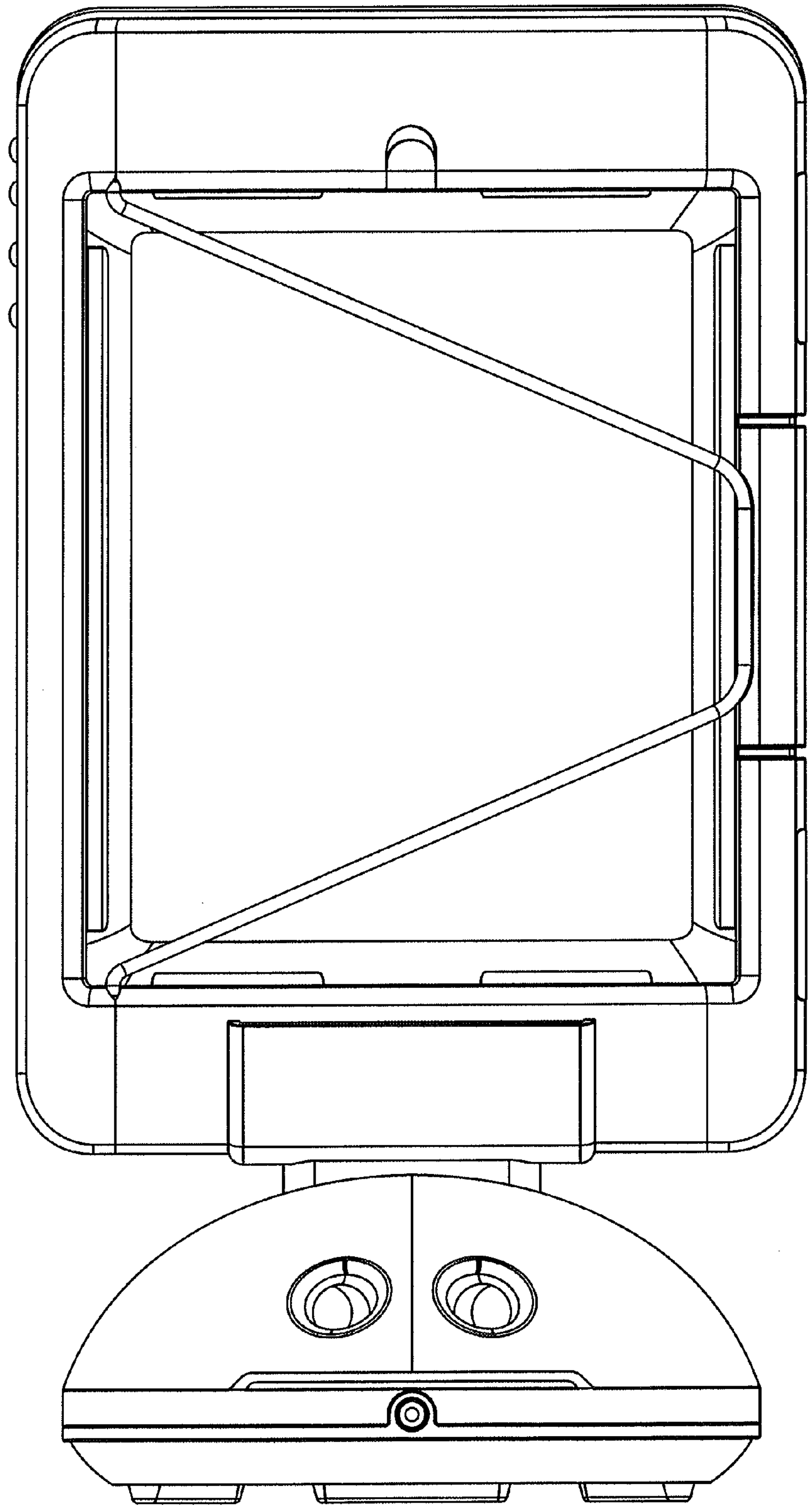
FIG. 16 depicts an exemplary rear view of the exemplary embodiment of FIG. 15.
Figure 17:
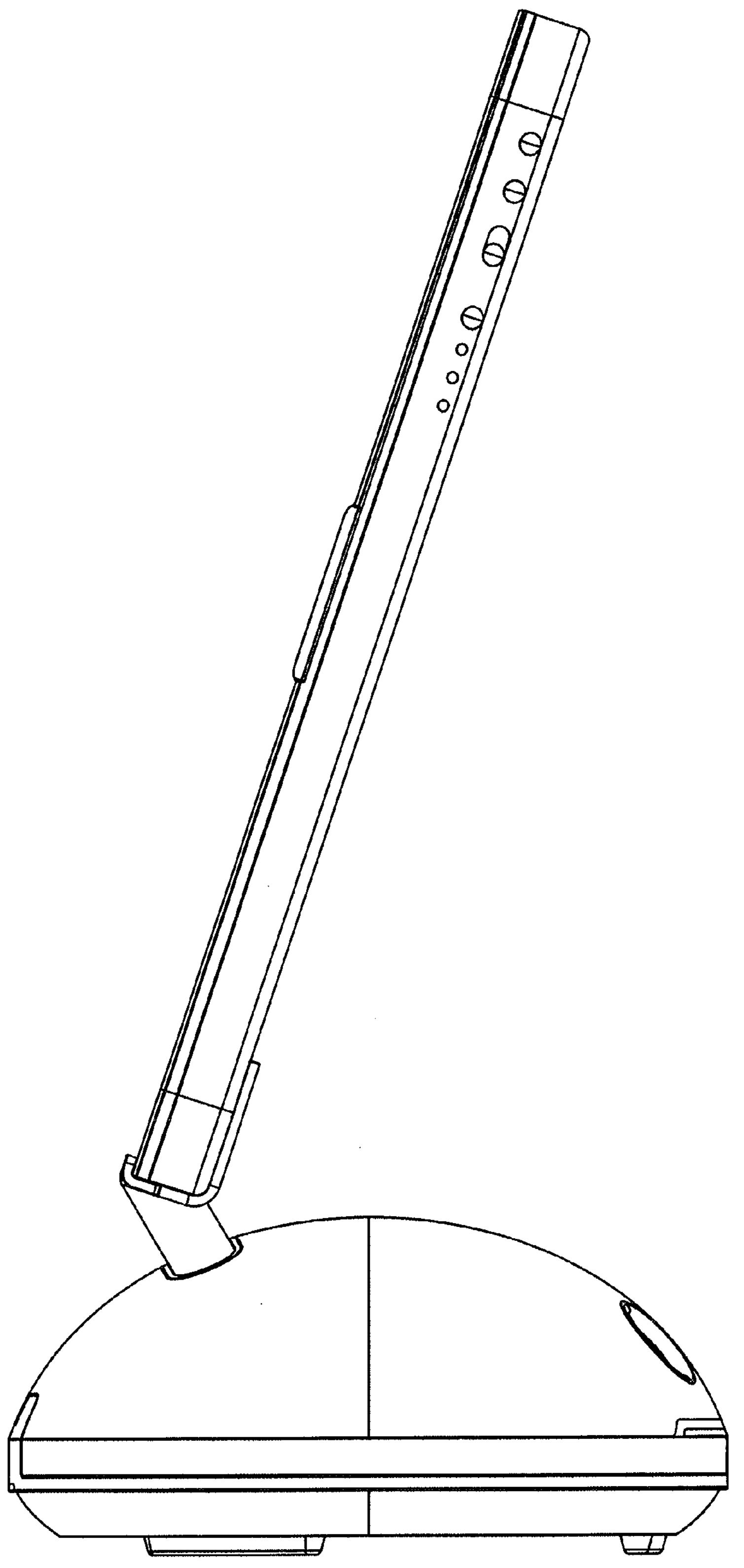
FIG. 17 depicts an exemplary side view of the exemplary embodiment of FIG. 15.
Figure 18:
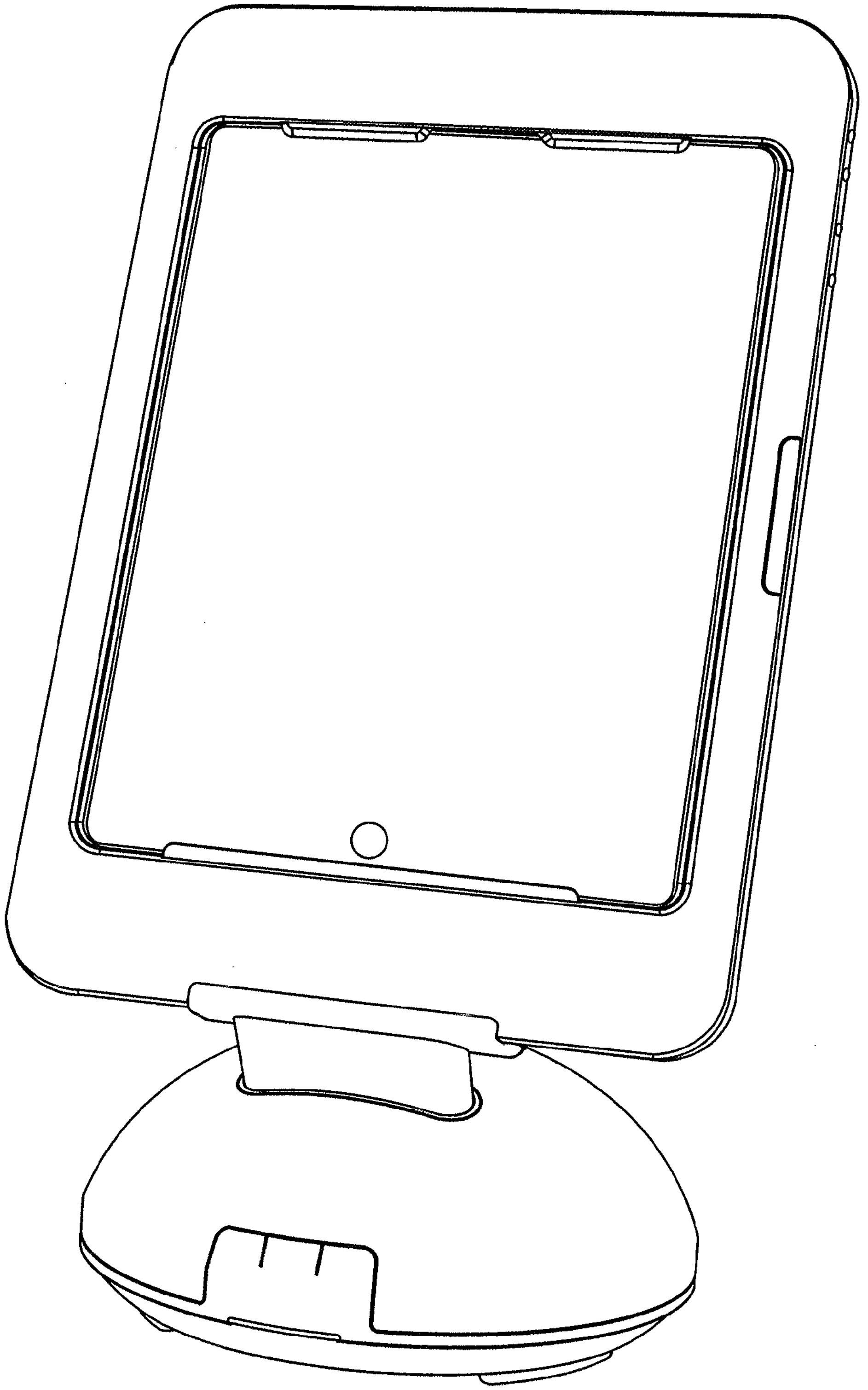
FIG. 18 depicts an exemplary perspective view of the exemplary embodiment of FIG. 15.

FIG. 11 illustrates a larger tablet device 101 with an exemplary speaker frame 201 connected to base unit 800. FIG. 12 illustrates a rear view, and FIG. 13 illustrates a side view. FIG. 14 illustrates a perspective view. FIG. 15 illustrates a front view with a different device/speaker-frame orientation. FIGS. 16-18 illustrate other views of the exemplary portrait orientation of the exemplary device/speaker-frame orientation. The exemplary speaker frames can include a docking port on one or both longer sides (e.g., for landscape oriented docking), and can include a docking port on one or both shorter sides (e.g., for portrait oriented docking).

Base unit 800 can include any number of wired (e.g., USB) or wireless connectors (e.g., Radio Frequency "RF," Infrared "IR," etc.), which can be used with computer accessories, such as a keyboard and mouse. In such an exemplary embodiment, it can be seen that exemplary base unit 800, device 101 and exemplary speaker frame 201 can be used together, with connected keyboard/mouse, to substantially create a home PC setup. Certain exemplary embodiments of exemplary base unit 800 can include additional hardware, such as processors, memory, storage, accelerators, etc., to further enhance the desktop computer experience in this exemplary configuration. Other exemplary embodiments can use only the device 101 resources, or a combination of the two. Use of externally connected I/O devices can be used instead of or in addition to device level I/O functions, such as touch screen input.

Certain exemplary embodiments can have a unified audio control. For example, if the device audio is set at a certain level, when the device is docked within an exemplary frame, the volume setting of the frame can automatically be set to the current setting of the device, or vice versa in other exemplary embodiments. Then, volume control on either the device (e.g., via screen control (or button control if not concealed by the exemplary speaker frame)) or the exemplary speaker frame (e.g., via button control) can adjust both the device setting and frame setting together. Alternative exemplary embodiments can be configured in any number of other ways, such as temporarily changing the docked device setting to an optimal fixed audio level, while allowing volume adjustments at the frame.

Likewise, volume control inputs on the base unit 800 can control only the base, the base and docked device, the base and docked speaker frame, or any combination. Further, in certain exemplary embodiment, the base may adopt the volume value of the exemplary speaker frame, or vice versa.

Figure 19:
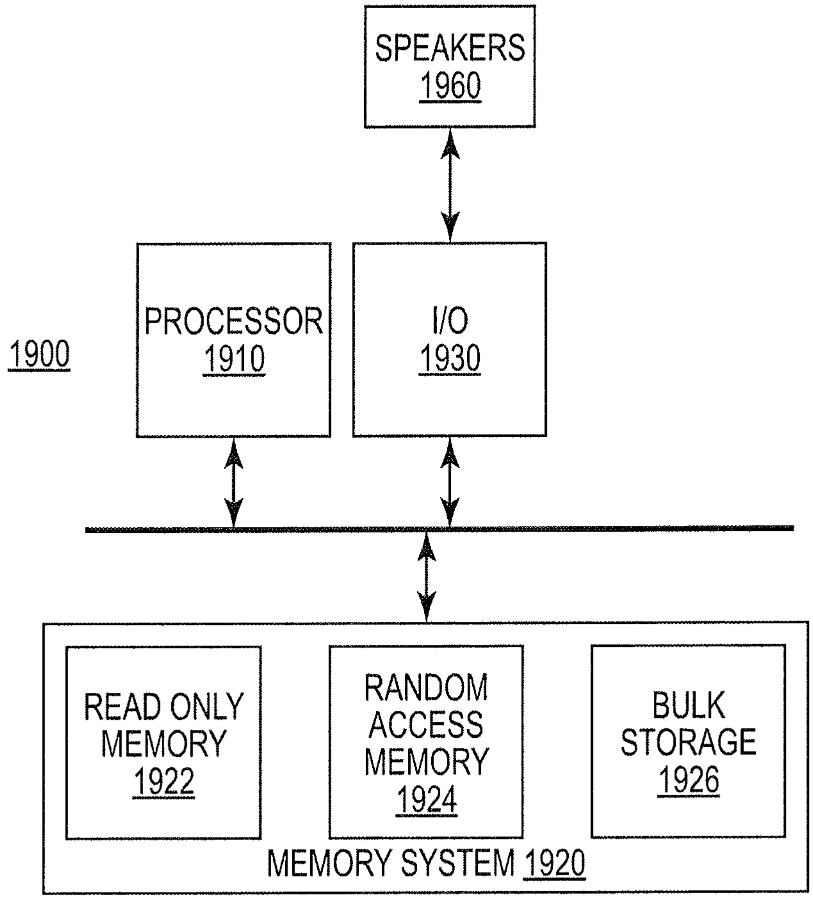
FIG. 19 depicts an exemplary system capable of being used with one or more exemplary embodiments of the present invention.

FIG. 19 illustrates an exemplary system 1900 that can be located within the inner docked device, the exemplary speaker frame, the exemplary base unit, or any combination of these locations. System 1900 can be configured to execute exemplary procedures, according to other exemplary embodiments of the present invention. The exemplary system 1900 can include a processor 1910, an input/output port 1930, which can include speakers 1960, and various memories 1920, including, e.g., read only memory 1922, random access memory 1924, and bulk storage memory 1926 (e.g., a disk drive, network drive, database, etc.). Different exemplary embodiments can include more or fewer components. For example, an exemplary base unit may include bulk storage 1926, while an exemplary speaker frame may only include RAM/ROM or no significant memory in other exemplary embodiments.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures which, although not explicitly shown or described herein, embody the principles of the disclosure and can be thus within the spirit and scope of the disclosure. Various different exemplary embodiments can be used together with one another, as well as interchangeably therewith, as should be understood by those having ordinary skill in the art. It should be understood that the exemplary procedures described herein can be stored on any computer accessible medium, including a hard drive, RAM, ROM, removable disks, CD-ROM, memory sticks, etc., and executed by a processing arrangement and/or computing arrangement which can be and/or include a hardware processors, microprocessor, mini, macro, mainframe, etc., including a plurality and/or combination thereof. In addition, certain terms used in the present disclosure, including the specification, drawings and numbered paragraphs thereof, can be used synonymously in certain instances, including, but not limited to, e.g., data and information. It should be understood that, while these words, and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

What is claimed is:

1. A system, comprising:

a speaker frame housing configured for connecting to and receiving a media device therein, the speaker frame housing comprising first audio speakers configured to output audio signals from the media device;

a base unit configured for connecting to and holding the speaker frame housing upright therein, the base unit comprising second audio speakers configured to output audio signals from the media device; and a speaker controller configured to apply equalization parameters to the first and second audio speakers responsive to detecting a connection between the speaker frame housing and the removable base unit;

wherein the speaker frame housing includes a docking connector configured to connect to the media device and the base unit comprises a base connector configured to connect to the speaker frame housing; and wherein the speaker frame housing includes the first audio speakers configured to output the audio signals from the media device when connected to the docking connector and the base unit includes the second audio speakers configured to output the audio signals from the media device when the speaker frame is connected to the base connector.

2. The system of claim 1, wherein the speaker frame housing includes at least one battery configured to power amplification of the first audio speakers.

3. The system of claim 2, wherein the at least one battery is further configured to supply power to the media device connected to the docking connector.

4. The system of claim 1, wherein the speaker frame housing is configured to extend around a perimeter of the media device received therein.

5. The system of claim 4, wherein the speaker controller is configured to apply the equalization parameters based on a gyroscope signal that identifies an orientation of the speaker frame housing.

6. The system of claim 5, wherein the gyroscope signal is generated by a first gyroscope housed within the frame housing and second gyroscope housed within the connected device, and wherein the speaker controller is configured to:

determine the orientation of the speaker frame housing using the gyroscope signal; and allocate left-side audio signals to one or more of the first and second speakers on a left side of the orientation and allocate right-side audio signals to one or more of the first and second speakers on a right side of the orientation.

7. The system of claim 6, wherein the speaker controller is configured to:

determine a change in the orientation of the frame housing that changes a left/right placement of at least one of the first and second speakers; and reallocate the at least one speaker's left-side and right-side audio signals.

8. The system of claim 1, wherein the base unit is configured to connect to and hold upright the media device independent of the speaker frame housing.

9. The system of claim 8, wherein the second audio speakers of the base unit are configured for low frequency audio signals when the speaker frame housing with the first audio speakers is connected to the base unit.

10. The system of claim 9, wherein the second audio speakers are configured for full-range frequency audio signals when the media device is connected to the base unit independent of the speaker frame housing.

11. The system of claim 4, wherein the speaker frame housing includes at least one connector configured to dock the speaker frame housing with the base unit.

12. The system of claim 11, wherein the speaker frame housing includes at least two connectors on adjacent edges thereof, one of the at least two connectors configured to dock the speaker frame housing with the base unit in a landscape orientation and another of the at least two connectors configured to dock the speaker frame housing with the base unit in a portrait orientation.

13. A speaker frame device, comprising:

a frame housing including at least one first audio speaker and having a plurality of sides forming a perimeter of an inner area for connecting at least one media device received therein;

a base unit configured to hold the frame housing upright, the base unit include at least one second audio speaker; and a speaker controller configured to apply equalization parameters to the first and second audio speakers responsive to detecting a connection between the speaker frame housing and the base unit;

wherein the inner area of the speaker frame housing is sized to receive the at least one media device such that a shape of the frame housing with the received media device is substantially similar to the at least one media device and larger in at least one dimension than the at least one media device;

wherein the inner area of the speaker frame housing includes a docking connector configured to interface with an input connector of the at least one media device and the base unit comprises a base connector configured to interface with the frame housing; and wherein the frame housing includes the at least one first audio speaker configured to output audio signals from the media device received within the frame housing and the base unit comprises the at least one second speaker configured to output the audio signals with the frame housing held upright in the base unit.

14. The speaker frame device of claim 13, wherein the frame housing includes a plurality of speakers.

15. The speaker frame device of claim 14, wherein the speaker controller is configured to determine an orientation of the frame housing and allocate low and mid-high audio signals to the one or more first and second speakers, based on the orientation.

16. The speaker frame device of claim 15, wherein the speaker controller is configured to receive a gyroscope signal that identifies the orientation of the frame housing, wherein the gyroscope signal is generated by a first gyroscope housed within the frame housing and a second gyroscope housed within the media device.

17. The speaker frame device of claim 14, further comprising at least one port adapted to connect to at least one additional speaker.

* * * * *